US012278803B2

United States Patent
Low et al.

(10) Patent No.: US 12,278,803 B2
(45) Date of Patent: Apr. 15, 2025

(54) DNS REQUEST OBFUSCATION (71) Applicant: International Business Machines Corporation, Armonk, NY (US)

(72) Inventors: Andrew Low, Stittsville (CA); Zachary Charles Beckett Pywell, Stamford (GB); James McConnell, Ottawa (CA); Nathan James Roane, Gatineau (CA); Troy E. Fisher, Phoenixville, PA (US); Dusan Boskovic, Ottawa (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 193 days.

(21) Appl. No.: 18/068,764

(22) Filed: Dec. 20, 2022

(65) Prior Publication Data
US 2024/0205194 A1  Jun. 20, 2024

(51) Int. Cl.
*H04L 29/06* (2006.01)
*H04L 9/40* (2022.01)
*H04L 61/4511* (2022.01)

(52) U.S. Cl.
CPC ...... *H04L 63/0414* (2013.01); *H04L 61/4511* (2022.05); *H04L 63/1491* (2013.01)

(58) Field of Classification Search
CPC .................................................. H04L 61/4511
See application file for complete search history.

(56) References Cited

U.S. PATENT DOCUMENTS

| 8,224,994 B1 * | 7/2012 | Schneider | G06Q 30/02 709/217 |
| 8,549,640 B2 * | 10/2013 | Lyle | G06F 21/53 726/28 |
| 8,880,686 B2 | 11/2014 | McPherson et al. | |
| 9,270,646 B2 | 2/2016 | Shelest | |

(Continued)

FOREIGN PATENT DOCUMENTS

| CN | 109525553 A | 3/2019 |
| CN | 111800786 A | 10/2020 |

OTHER PUBLICATIONS

"Confidential DNS", retrieved Aug. 10, 2022 <https://web.archive.org/web/20200812045401/https://tools.ietf.org/id/draftwijngaards-dnsop-confidentialdns-00.html>, 4 pgs.

(Continued)

*Primary Examiner* — Jason K Gee
(74) *Attorney, Agent, or Firm* — Anthony Mauricio Pallone, Esq.; Matthew M. Hulihan, Esq.; Heslin Rothenberg Farley & Mesiti P.C.

(57) ABSTRACT

DNS request obfuscation includes generating decoy domain name system (DNS) requests for obfuscating DNS request activity being handled by a private DNS server for an organization, and sending the decoy DNS requests to external DNS server(s) for resolution, receiving a DNS request seeking a DNS lookup for a client device, obfuscating the DNS request by sending, to an external DNS server of the external DNS server(s), the DNS request interspersed with at least some of the generated decoy DNS requests sent to the external DNS server, receiving, from the external DNS server, a DNS response to the sent DNS request, and providing the DNS response to a source of the DNS request.

20 Claims, 4 Drawing Sheets

(56) References Cited

U.S. PATENT DOCUMENTS

| | | |
|---|---|---|
| 9,894,041 B2 | 2/2018 | Norum et al. |
| 10,362,057 B1 | 7/2019 | Wu |
| 10,505,985 B1 | 12/2019 | Walter et al. |
| 2008/0140847 A1* | 6/2008 | Almog ............... H04L 61/4511 709/228 |
| 2018/0048665 A1* | 2/2018 | Shulman ............ H04L 63/1425 |
| 2018/0139171 A1* | 5/2018 | Klitenik ............... H04W 64/00 |
| 2021/0250332 A1 | 8/2021 | Moore et al. |

OTHER PUBLICATIONS

Huitema, C., et al., "DNS-Based Service Discovery (DNS-SD) Privacy and Security Requirements (RFC8882)", Journal of IP.com, IP.com No. IPCOM000263561D, Sep. 11, 2020, 18 pgs.

Schmitt, P., et al., "Oblivious DNS: Practical Privacy for DNS Queries", ANRW '19: Proceedings of the Applied Networking Research Workshop, Jul. 2019, pp. 17-19.

Liu, Q., et al., "T2DNS: A Third-Party DNS Service with Privacy Preservation and Trustworthiness", 29th International Conference on Computer Communications and Networks (ICCCN), Sep. 30, 2020, 12 pgs.

"The Solutions : : dnsprivacy.org", DNS Privacy Solutions, retrieved Aug. 10, 2022 <https://dnsprivacy.org/the_solutions/>, 2 pgs.

International Search Report and Written Opinion for PCT/CN2023/133906 completed Feb. 22, 2024, 7 pgs.

Cimpanu Catalin. "DNS-over-HTTPS causes more problems than it solves, experts say", ZDNET/tech, Oct. 6, 2019, 13 pages, https://www.zdnet.com/article/dns-over-https-causes-more-problems-than-it-solves-experts-say/.

* cited by examiner

DNS REQUEST OBFUSCATION

BACKGROUND

Domain name system (DNS) requests for DNS lookups are frequent occurrences on network-connected client devices when a user engages with a client device to enter a website address—a string of text sometimes referred to as a uniform resource locator (URL)—into an address box of a web browser on the client device. Typically, the DNS request is sent from the client device to a DNS server that searches and locates the internet protocol (IP) address that is mapped to the entered string of text, and more specifically to a specific domain name present in the string. This activity is known as resolution. The IP address is identified to the web browser via a response to the DNS request, and the browser then sends a Hypertext Transfer Protocol (HTTP) request to a server identified by that IP address, the HTTP request being a request that the server provide a copy of the requested website to the client. If the request is approved, the server transmits this data to the web browser, which then assembles the data received from the server into a finished website that the user can view. This is generally how modern web browsing functions.

SUMMARY

Shortcomings of the prior art are overcome and additional advantages are provided through the provision of a computer-implemented method. The method generates decoy domain name system (DNS) requests for obfuscating DNS request activity being handled by a private DNS server for an organization, and sends the decoy DNS requests to one or more external DNS servers for resolution. The process receives, by the private DNS server, a DNS request seeking a DNS lookup for a client device. The method obfuscates the DNS request by sending, to an external DNS server of the one or more external DNS servers, the DNS request interspersed with at least some of the generated decoy DNS requests sent to the external DNS server. Additionally, the method receives, from the external DNS server, a DNS response to the sent DNS request. The method also provides the DNS response to a source of the DNS request.

Further, a computer system is provided that includes a memory and a processor in communication with the memory, wherein the computer system is configured to perform a method. The method generates decoy domain name system (DNS) requests for obfuscating DNS request activity being handled by a private DNS server for an organization, and sends the decoy DNS requests to one or more external DNS servers for resolution. The process receives, by the private DNS server, a DNS request seeking a DNS lookup for a client device. The method obfuscates the DNS request by sending, to an external DNS server of the one or more external DNS servers, the DNS request interspersed with at least some of the generated decoy DNS requests sent to the external DNS server. Additionally, the method receives, from the external DNS server, a DNS response to the sent DNS request. The method also provides the DNS response to a source of the DNS request.

Yet further, a computer program product including a computer readable storage medium readable by a processing circuit and storing instructions for execution by the processing circuit is provided for performing a method. The method generates decoy domain name system (DNS) requests for obfuscating DNS request activity being handled by a private DNS server for an organization, and sends the decoy DNS requests to one or more external DNS servers for resolution. The process receives, by the private DNS server, a DNS request seeking a DNS lookup for a client device. The method obfuscates the DNS request by sending, to an external DNS server of the one or more external DNS servers, the DNS request interspersed with at least some of the generated decoy DNS requests sent to the external DNS server. Additionally, the method receives, from the external DNS server, a DNS response to the sent DNS request. The method also provides the DNS response to a source of the DNS request.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

A problem with the above-described approach for DNS resolution, specifically the provision of DNS requests to DNS server(s) for resolution, is that these DNS server(s) become aware of what websites are being requested for viewing and the timing of these requests. From this, observers of the DNS activity can gain an understanding of potentially sensitive information, such as user browsing habits including timing and frequency of internet activity, the content that a user is requesting and viewing, and user location based on the IP address of the DNS requests, as examples. As another example, it may be possible to uniquely identify a given web page via the 'signature' of the set of domains that are resolved (and possibly the order of those resolutions if enough is known about a given web browser implementation). Consider a given web page that links to images or other web-based artifacts, some which may be hosted on other domains. If the attacker has the ability to watermark a given web page with additional (potentially hidden) web resources that need to be resolved to render the page, it may be possible to further the identification. This is a similar trick to 'tracking pixels' except it is based on inserting small or invisible elements on the web page which are sourced from unique domains. These are just some examples of how DNS request activity may be compromising to users. Users are left to trust that the DNS server will not provide user data to third parties. However, the motives of the owners of the DNS servers might be nefarious, for instance they might sell DNS request data to third parties or snoop as mentioned previously. Beyond nefarious activity of a DNS server itself, there are other ways the security and sensitivity of this external traffic could become compromised. The external DNS server itself could become compromised by a nefarious actor, or a nefarious actor could observe network traffic flowing into and out of the DNS server, as examples.

Described herein are approaches for DNS request resolution, including obfuscation of DNS requests that flow to external DNS servers for resolution, the DNS requests being made by client(s) of a private network. For instance, provided are approaches for DNS requests to be anonymized and made more private by way of DNS request obfuscation that obfuscates user DNS request data such that third parties, including those operating external DNS servers, are unable to accurately identify user browsing trends and other sensitive data that might otherwise be gleaned from user DNS requests. In some aspects, a system of private DNS server(s) is put into place that obfuscates legitimate client DNS requests within a noise of decoy requests—ones that are generated and sent for external resolution but that are not actual, legitimate DNS requests originating from a requesting user device. The responses to the legitimate DNS requests and decoy requests can be saved in local DNS cache(s) of the private DNS server(s) in case subsequent legitimate DNS requests are received for those resolved legitimate or decoy requests. Saving the results in a local cache would, at least for a time, avoid the need to send future external requests for the same resolutions to external sources.

The obfuscation activity as described herein helps to anonymize and obfuscate the legitimate DNS requests made from client computers and thereby render it difficult or impossible for outsiders to snoop on the 'meaningful', legitimate requests made by those clients. Even in other approaches where client traffic flows through an encrypted communication tunnel of a virtual private network (VPN) connection to a target, the client DNS requests can still be read by the DNS server upon which the VPN host relies, and therefore even if the client connection to the web is secure, trust is still placed in the VPN's DNS server as well to have a fully secure connection. In contrast, aspects described herein reduce the necessity of trustworthiness in the external DNS server(s) being used because of the obfuscating of data (DNS requests) being sent to the external DNS servers by way of noise being send in the form of decoy DNS requests. All data (e.g., resolutions) returned based on these outgoing legitimate and decoy DNS requests are thereby secure and anonymized, greatly reducing the ability for someone to snoop on the legitimate DNS requests being made from the clients utilizing this DNS obfuscation. Aspects also provide plausible deniability by making it difficult to trace an individual DNS request made at a specific point in time back to a single user or IP. In addition, since resolutions of both legitimate and decoy DNS requests may be cached locally and are already anonymized, this enables reduction in the time it takes for DNS lookups to complete, as resolution of future DNS requests can be attempted first against the local DNS cache(s) before determining that an external DNS request (e.g., to a public DNS server) is needed.

Accordingly, aspects described in further detail herein can provide secure communication to servers, hiding browsing activity in a steady stream of upstream lookups, distributing DNS requests to multiple different upstream servers, and adding noise in the form of decoy DNS requests to drown-out, from an observational standpoint, legitimate DNS requests being made by an actual user. The solution becomes even stronger as the number of users of the solution increases, since a greater volume of caching occurs and therefore fewer external DNS resolutions are requested.

Figure 1:
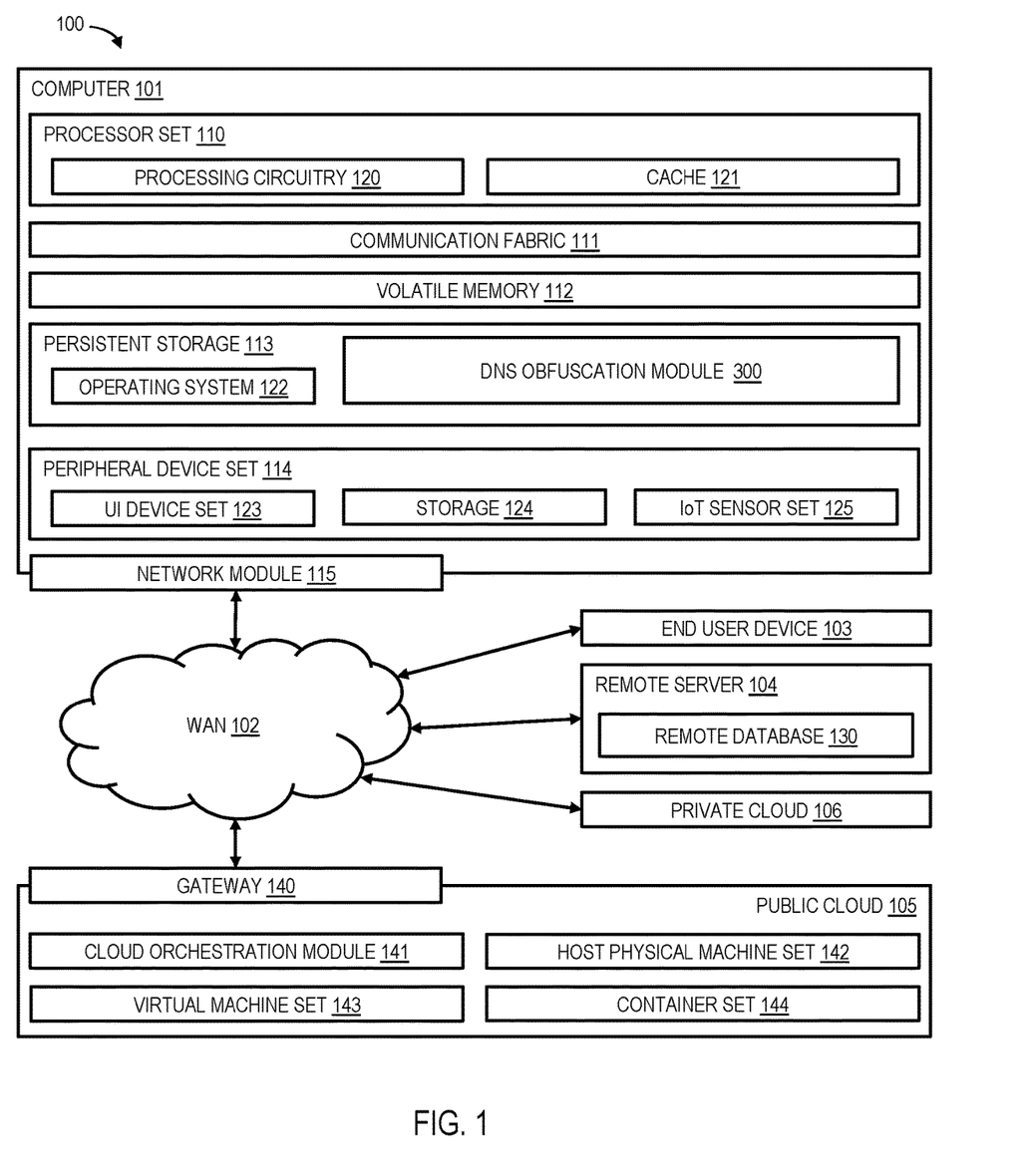
FIG. 1 depicts an example computing environment to incorporate and/or use aspects described herein.

One or more embodiments described herein may be incorporated in, performed by and/or used by a computing environment, such as computing environment 100 of FIG. 1. As examples, a computing environment may be of various architecture(s) and of various type(s), including, but not limited to: personal computing, client-server, distributed, virtual, emulated, partitioned, non-partitioned, cloud-based, quantum, grid, time-sharing, cluster, peer-to-peer, mobile, having one node or multiple nodes, having one processor or multiple processors, and/or any other type of environment and/or configuration, etc. that is capable of executing process(es) that perform any combination of one or more aspects described herein. Therefore, aspects described and claimed herein are not limited to a particular architecture or environment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as code of DNS obfuscator module 300. In addition to block 300, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 300, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 300 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 300 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The computing environment described above in FIG. 1 is only one example of a computing environment to incorporate, perform, and/or use aspect(s) of the present invention. Other examples are possible. For instance, in one or more embodiments, one or more of the components/modules of FIG. 1 are not included in the computing environment and/or are not used for one or more aspects of the present invention. Further, in one or more embodiments, additional and/or other components/modules may be used. Other variations are possible.

Figure 2:
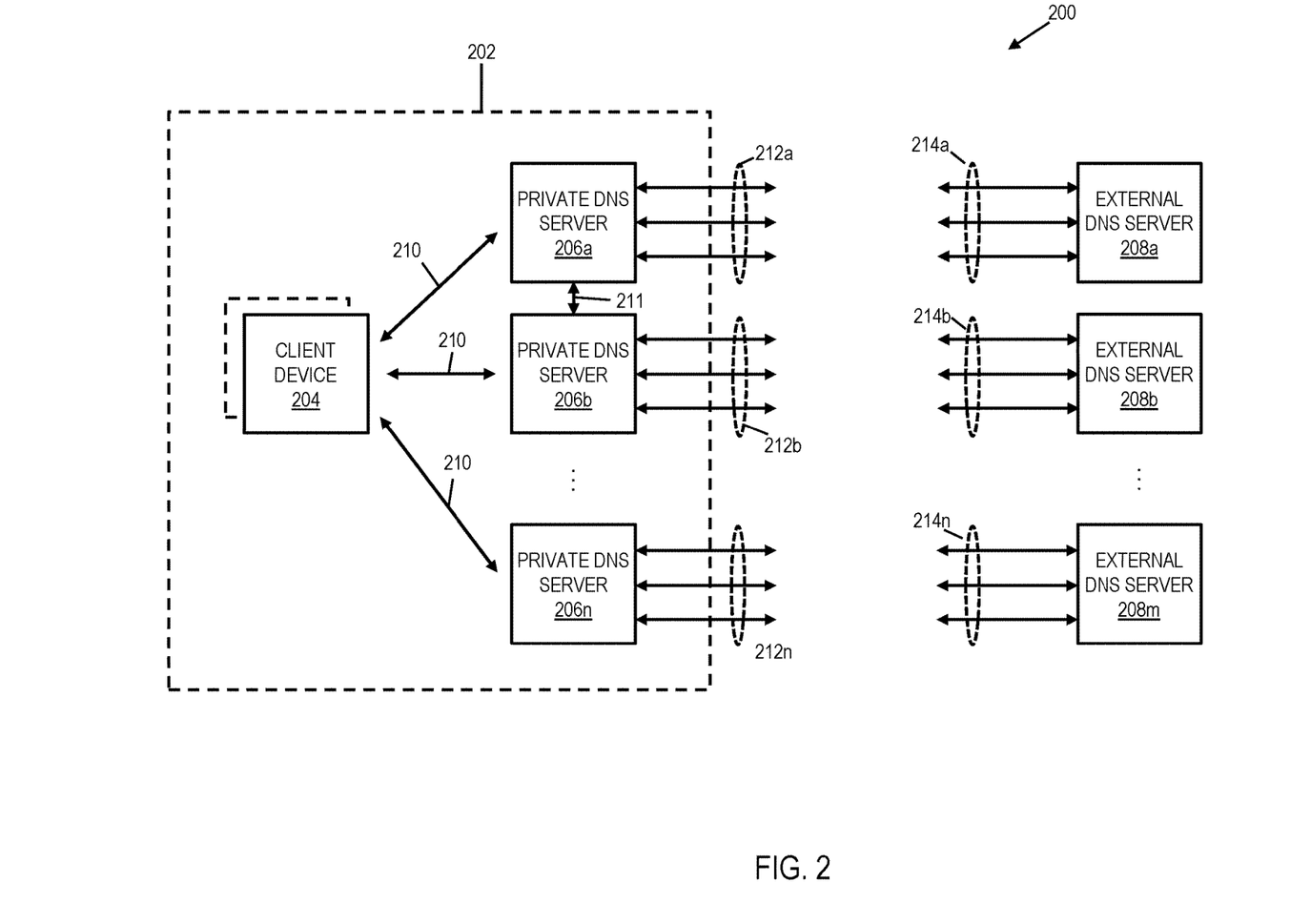
FIG. 2 depicts an example environment for DNS request obfuscation.

FIG. 2 depicts another example environment for DNS request obfuscation. Environment 200 includes a private network 202 with client computer systems/device(s) 204 and private DNS servers 206a, 206b, . . . , 206n. The client device(s) 204 communicate DNS requests to, and receive responses from, private DNS servers 206a, 206b, . . . , 206n over communication paths 210. Communications paths may be wired and/or wireless communications link(s), such as Ethernet-based wired or wireless connections, but more generally may be any appropriate wireless and/or wired communication link(s) for communicating data. Often, though not always, communications paths are implemented via hardware and software-based network facilities. The client devices 204 and private DNS servers 206 can be separate, discrete physical devices partially or wholly co-located or remotely located from each other, in examples.

Environment also includes external DNS servers 208a, 208b, . . . , 208m, which are external to private network 202. The external DNS servers might be public DNS servers and/or available across another network (public or private; not shown) to which the private network 202 connects.

Communications paths 212a, 212b, . . . , 212n represent communications outgoing from, and incoming to, the private DNS servers 206a, 206b, . . . , 206n, respectively. For instance, the private DNS servers can issue externally-directed DNS requests to any/all of external DNS servers 208a, 208b, . . . , 208m and receive responses in response to those requests. Communications paths 214a, 214b, . . . , 214n represent communications incoming to, and outgoing from, the external DNS servers 208a, 208b, . . . , 208m, respectively. The external DNS servers can receive DNS requests from any/all of the private DNS servers 206a, 206b, . . . , 206n and issue responses in response to those requests. Traffic flowing between private DNS servers and external DNS servers can be implemented using DNS over TLS or DNS over HTTPS, as examples, to increase security. Additionally, private DNS servers 206a, 206b, . . . , 206n communicate with each other, for instance as represented by communication path 211 between private DNS servers 206a and 206b, for communication of DNS requests and/or other types of communications.

Activities of the client device(s) 204 include issuing DNS requests to one or more of the private DNS servers on the network 202. Programs such as web browsers prompt DNS lookups in order to retrieve and render requested web-provided content. Private network 202 and its components are considered a trusted network to the client devices 204, and therefore the private DNS servers 206 are considered trusted entities to the client devices 204. The client devices 204 provide DNS requests within private network 202 to the private DNS servers 206 for resolution.

In examples, the private network 202 is a network of an organization, whereby the organization provides one or more private DNS servers to handle client DNS requests.

Various activities of the private DNS servers 206 to provide DNS obfuscation are described in detail herein. In one aspect, a private DNS server 206 of the private network 202 receives a DNS request seeking a DNS lookup for a client device 204. In some examples, this DNS request is received from the client device 204 itself. In other examples as described herein it is received from another of the private DNS servers 206 of the private network 202. A private DNS server receiving a DNS request can perform processes to resolve or aid in the resolution of the DNS request. If the private DNS server 206 does not possess a cached resolution of the request, it might, for example, issue an external DNS request to one of the external DNS servers 208 or pass the request along to another of the private DNS servers 206. Various scenarios are possible and are described herein.

It is noted that the example environment of FIG. 2 depicts multiple (n) number of private DNS servers and multiple (m) number of external DNS servers by way of example only, and not limitation. Aspects described herein encompass situations where there is any number of (including just one) private DNS server(s) and/or any number of (including just one) external DNS server(s).

In an aspect described herein, DNS requests issued by client device(s) 204 and/or seeking a DNS lookup for client device(s) 204, which may be referred to herein as 'real' or legitimate DNS requests, are obscured in a collection of noise, the noise being in the form of other DNS requests that are generated to be decoys for the legitimate DNS requests for the client device(s) 204. In this regard, process(es) perform generating or obtaining decoy DNS requests for obfuscating DNS request activity—legitimate DNS requests—being handled by private DNS server(s) for an organization. Decoys can necessarily request a different resolution than a legitimate request that they are helping to obfuscate. Process(es) can send these decoy DNS requests to external DNS server(s) for resolution, and do so strategically to obfuscate the legitimate DNS requests that are being sent externally for resolution. The generated noise thereby helps to obfuscate legitimate DNS requests that the privacy DNS server(s) sends out to external DNS server(s).

More specifically, multiple DNS lookup requests can be sent to external DNS servers, where these multiple DNS requests include both (i) legitimate DNS requests made on behalf of client device 204 and (ii) decoy DNS requests generated for a purpose of obfuscating/obscuring those legitimate DNS requests. A legitimate DNS request is obfuscated by sending, to an external DNS server 208, the DNS request interspersed with at least some of the generated decoy DNS requests that are sent to the external DNS server—in other words with some decoy DNS requests sent with, before, and/or after the legitimate DNS requests. As part of this obfuscation and interspersion, decoy DNS requests can be sent contemporaneously with legitimate DNS requests so that actors observing DNS request activity from outside the private network 202 will 'see' the legitimate DNS requests only as part of a bigger collection of DNS requests flowing out of the private network 202 to the external DNS server(s). It is noted that some decoy DNS request(s) to obfuscate a legitimate DNS request need not necessarily be sent to the same external DNS server as the legitimate DNS request; it is possible that decoy DNS requests will go to various of the external DNS servers, with only one of them being the target for the legitimate DNS request. An observer of all DNS request activity flowing out of the private network will see DNS requests going to each of the external servers, thereby convoluting any given legitimate DNS request with requests going to more than just the target server to handle that legitimate DNS request.

The legitimate DNS requests to be resolved externally can be sent to different external DNS servers 208, as can the decoy DNS requests being generated and sent to obfuscate the legitimate DNS activity. In this manner, different legitimate DNS requests for DNS lookup for client device(s) can be obfuscated by selecting, randomly or otherwise, from the different external DNS servers and sending to the selected external DNS servers. These legitimate DNS requests can be interspersed in decoy DNS requests that also flow to the different external DNS servers. By spreading these requests across different external servers (and corresponding locations/sites if the external DNS servers are located remote form each other), this greatly reduces the risk that an attacker will see all of the upstream (external) DNS request activity, as attackers might more readily compromise only a single external server rather than the entire collection of external servers being used, and therefore makes it much harder to determine what is actually being looked up.

The generation and sending of decoy DNS requests can be performed in accordance with configurable criteria, for instance criteria that dictates the lookup targets, e.g., content being requested, for the generated decoy DNS requests. In other words, the decoy DNS requests can request resolutions for sites/pages that are specifically and intentionally targeted, rather than randomly selected, though random selection of decoy targets is a possibility too.

By way of example and not limitation, if legitimate client DNS requests target retrieval of news articles relating to biotechnology, the decoy DNS requests can be generated such that they target resolutions tailored based on the lookup targets of the legitimate client DNS requests. The decoy requests might target other news article servers, for instance, or other servers hosting content relating to biotechnology. If the target is biotechnology news from one news website, some decoy requests might request resolutions pointing to other types of content from that one website and/or biotechnology or other types of content from other news websites.

Thus, the configurable criteria in accordance with which decoy DNS request(s) are generated can specify a relatedness level that a process is to use in generating the decoy DNS requests. The relatedness level indicates a desired level of relation between the lookup targets for generated decoy DNS request(s) and a lookup target of a legitimate DNS request, for example. In one embodiment, the relatedness level is implemented as a sliding scale that allows a user of a client device making a DNS request (or an administrator of the system) to adjust the relatedness of decoy DNS requests to the client's DNS query. On one end of the scale, the decoys could be targeted to something very similar to the user's current DNS request, while on the other end of the scale, the queries could be unrelated to the user's requests.

The relatedness level could be set with a primary consideration and goal being to generate decoys that look the least telling to an outsider spying on the DNS requests coming out of private network 202 as to the legitimate user activity. It might be expected logically, and without needing to snoop on DNS activity, that a biotechnology company and specific client devices thereof issue a large volume of requests for resolutions to biotechnology related resources. If the noise (decoy DNS requests) is generally directed to content spanning a very wide array of topics having nothing to do with biotechnology, it might be informative to a nefarious outside observer that those DNS requests are just noise/decoys, and that the legitimate DNS requests are the ones around biotechnology. The legitimate DNS requests have not been adequately obfuscated in that example because the legitimate ones are relatively easily discernible to the outside observer. On the other hand, if there are no or very few decoys that target content that is not biotechnology related, then a legitimate DNS request that targets something not biotechnology related might not be adequately obfuscated. The relatedness level can therefore depend on circumstances. An organization that has legitimate DNS requests covering a wide variety of subject matters would not desire the noise to be concentrated to just one subject matter, and an organization that has a substantial volume of legitimate DNS requests covering a very niche subtopic of a broader category might want noise that is substantially within that broader category and does not stray far from that category.

It is noted that the generation of decoys for sending can consider both individual DNS requests as well as an aggregate of DNS requests made over time. It may be that decoys generated from past activity are to be used for obfuscating future DNS requests. Some decoy(s) sent contemporaneous with a given legitimate DNS request could have been generated based on that request itself, while decoys could have been generated based on previous legitimate DNS requests, either by the same client device or otherwise, and/or at an earlier time. Previous legitimate DNS requests can help inform the generation of additional decoys to use in the obfuscation of future legitimate DNS requests. The effectiveness of the obfuscation is enhanced when there are multiple active client devices making DNS queries, as it will increase the original, or seed, data that serves as a basis for generating the related decoy DNS queries.

Decoy requests can therefore be pre-generated based on prior legitimate requests for use in obfuscating later legitimate requests. This can reduce the latency in the identification and obtaining of decoys to send contemporaneous with a legitimate DNS request, which might be temporarily withheld from sending externally until the decoys to use can be identified and at least some can be sent externally prior to sending the legitimate DNS request. This also ensures that the effect of legitimate requests on decoy generation for obfuscation spreads out over time, since those decoys may be used at later times in connection with other legitimate DNS requests.

If there are no decoy requests generated from prior legitimate DNS requests and available to use with a given legitimate DNS request, decoys could come from seed requests based on highly popular websites and/or from decoys generated at that time based on the legitimate request, as examples.

Additional examples of sources from which decoy requests can be generated include one or more of the following, which can help to ensure that the noise matches a selected relatedness level:

Scraping results from search engine(s): This refers to search results pertaining to the content being provided at the lookup target of the legitimate DNS request. If the legitimate DNS request is a resolution for a site with biotechnology news, automated searching on biotechnology news can be performed using search engine(s). The results from the search(es) can inform of other sites targeted by decoy request. For instance, decoy requests can be generated that request resolutions of those search results.

Crowdsourcing from other legitimate DNS requests in the organization or user's organizational area (and/or the decoys used for those): Other legitimate DNS requests of the organization and/or decoy DNS request(s) generated based on those legitimate DNS requests or similar DNS requests can be used as, or to inform generation of, decoy DNS requests to use with later legitimate requests. For instance, in an organization where many users view various different news sources, their client devices will produce legitimate DNS requests with lookups related to news content. This can prompt generation of various decoy requests to be used in the obfuscation of those requests. Further, the loading of the target content of such requests is expected to load various additional content (advertisements, etc.) that themselves prompt additional legitimate DNS requests. When a legitimate DNS request for news content arrives at a later time, the prior legitimate news content DNS requests and the decoys generated from and/or used in the obfuscation of those can inform possible sources of decoys to generate and use in obfuscating the later legitimate DNS request.

Administrator-provided selections of decoy/noise sources: Administrators or standard users might choose their own noise to hide legitimate requests, using options to configure which topics or links to use for obfuscation, as examples.

As noted, in situations where there are multiple external DNS servers 208 available to handle upstream DNS requests, the DNS requests, both legitimate and decoy, can be spread across the multiple external servers 208. In some examples, any given outgoing/external DNS request—legitimate or decoy—is sent to just one upstream (external) DNS server. In other words, the same request is not sent to multiple of the external servers as part of obfuscating a given legitimate DNS request. By using multiple external DNS servers, this ensures that no one single external server has a full picture of DNS history, and the DNS lookup history that any given external server possesses is one that includes both legitimate and decoy DNS requests.

Additionally, when there are multiple private DNS servers 206 to handle legitimate DNS requests of client devices 204, such DNS requests could be distributed among them to further decentralize the specific sources of requests. In other words, a private DNS server receiving a DNS request from a client might provide the request to a different server of the private DNS servers for handling. The request might be passed internally in the private network any number of times, after which the latest private DNS server to hold the request sends it to an external DNS server. The external DNS server sees the request coming from the latest private DNS server but is unaware of the passage of the request through the intervening private DNS servers.

The generating and sending of the decoy DNS requests can also be performed in accordance with configurable criteria that dictates timing to send the decoy DNS requests. In one example, a continuous 'heartbeat' of decoy requests is sent to ensure that users' activities cannot be understood by monitoring the frequency and time of DNS requests. This approach would send decoy DNS requests that obfuscate legitimate DNS requests sent after regular business hours of an organization, for instance. In case a user working after hours initiates a DNS request, the regularly sent decoys would help obfuscate the legitimate request so it is not clear to an outside observer which client is making the request and even that any of the DNS requests flowing out of the private network 202 around that time are legitimate DNS requests.

The configurable criteria can therefore include a rate at which to send DNS requests to the external DNS server(s). The rate can comprise a number of DNS requests to send per segment of time, and that number can be a total of both legitimate and decoy DNS requests to send. As an example, the private DNS servers of the private network can be configured to collectively send 5,000 DNS requests per hour. The system can assume that all such requests will be decoy requests unless there are legitimate requests to send. Since the number of legitimate DNS requests that arise during that hour will vary dependent on user activity and is generally uncontrollable, the default practice can be to schedule decoy DNS requests to send unless legitimate DNS requests are pending. To ensure that this 'heartbeat' number of requests is substantially constant, the number of legitimate DNS requests being sent can be subtracted from that heartbeat number to inform the number of decoy requests to utilize. In this way, the number of decoy DNS requests to send in a segment of time is based on a number of legitimate client DNS requests, including the received DNS request, being sent in the segment of time. The granularity of these numbers can vary as desired. For instance, the heartbeat number could be set per user, client device, group of client devices, collection of all client devices in the network, or by any other granularity. For example, if a user generates 100 requests per hour and the heartbeat number of total DNS requests to send externally per hour for that user is 5,000, the system can reduce the number of decoy requests to send from by 100 to arrive at 5,000−100=4,900 decoy requests to send in that hour window.

As an enhancement to this heartbeat concept, the heartbeat rate can dynamically adjust based on an overall client DNS request activity load. Again, the granularity can be per single user, user group, organization, or any other level of desired granularity. Under this approach, the system dynamically adjusts the rate of decoy request transmission based on the level of legitimate DNS requests during the time period. Using the example above of 5,000 requests per hour, this rate might be sufficient for obscuring 100 or fewer legitimate requests per hour (as an example), but insufficient to adequately obscure 3,000 legitimate requests per hour. An example scheme could provide thresholds or ranges of legitimate requests (i.e., 1-100, 101-500, 501-1,000, etc.) and respective heartbeat rates corresponding to those ranges (i.e., 5,000 requests, 20,000 requests, 50,000 requests, etc.) to ensure that a sufficient amount of noise in the form of decoy requests is being provided to obscure the legitimate requests. Another approach to dynamic adjustment is to scale the number of decoy requests to send per unit of time based on the actual, average, or some other statistical number of legitimate requests actually being serviced and/or estimated to be serviced during that unit of time. For example, the number of decoy requests to send could be a function (such as a scalar multiple) of an actual number of legitimate requests pushed out in the preceding unit of time, an average number of requests handled per unit of time of a timespan, or an estimated number of legitimate requests to handle during the unit of time. There could be a target number of decoy requests to be sent for each legitimate request sent. In addition to this, the number of legitimate DNS requests actually sent for external resolution during a unit of time can be monitored in real time and the rate of decoy send during that unit of time can be dynamically adjusted to achieve the desired total number of requests to be sent during that period of time. Various approaches are possible.

Eventually, a private DNS server making an external DNS request to an external DNS server receives from the external DNS server a DNS response. At that point, the receiving private DNS server can provide the DNS response to a source of the DNS request and perform any other desired handling. In some scenarios, such as where there is just one private DNS server, the private DNS server receives the response and provides the resolution to the requesting client device as the source of the DNS request.

In some scenarios where there are two or more private DNS severs, a private DNS server receives a DNS request from another private DNS server, which itself received the request from a client device or another of the private DNS servers. While the legitimate DNS request ultimately originates from a client device, the request might travel through one or more private DNS server hops before it reaches the private DNS server that is to make the external request to an external DNS server. In these situations, the 'source' of the DNS request requested by the private DNS server that sends the request to the external server and receives the response therefrom could encompass the client device from which the DNS request originated and/or any intervening private DNS server through which the request was routed. The private DNS server communicating with the external server to resolve request could receive and provide the resolution to the client device, to any one or more of the other private DNS servers of the private network, or to a combination of the two. In a specific embodiment, the resolution flows in the reverse direction of the path over which it traveled from the client device to the private DNS server making the external request.

Another aspect described herein is the caching of DNS responses by the private DNS servers, and in some example retention of that resolution for as long as possible, for instance until lapse of a time-to-live (TTL) when a record falls out of validity. A greater extent of caching means enables the system to minimize the number of legitimate DNS requests that would need to flow out of the private network to untrusted external DNS servers. Thus, processing by a private DNS server can further include determining, based on receiving a DNS request, whether a resolution of the DNS request is cached by the private DNS server, and then, based on determining that no resolution of the DNS request is cached by the private DNS server, obfuscating the DNS request as part of an external lookup.

Extending this, a private DNS server handling a request can leverage the other private DNS servers of the network by initiating attempted resolution of the DNS request by one or more of them, for instance by sending the request to one or more of them and/or asking whether any one or more of them possesses or has access to a cached resolution for the request. By assuming DNS records cached in the private network are valid, the system can attempt to make a trusted DNS resolution to one of the private DNS servers and avoid making an external request, if possible. Practically speaking, a large organization would likely run a 'cluster' of private DNS servers that coordinate to avoid making duplicate lookups to any external server if any of the private DNS servers have a valid cached resolution. A receiving private DNS server can check whether the resolution is cached on any other of the private DNS servers of the network, and, if no other private DNS server on the network has the resolution, determine to obfuscate the request as part of an external inquiry that the server makes to an external DNS server. Alternatively, the DNS server could pass the request along to one or more of the other private DNS servers for handling in a similar manner. Other approaches may be possible, for instance one in which a receiving DNS server identifies what resolutions other private DNS server(s) in the network has cached in the network using a distributed data structure(s) in which the private DNS servers indicate to each other what they have cached. As another option, there might be a coordinating device on the network that can determine what each private DNS server has cached and inform an inquiring private DNS server where to send a DNS request for resolution, for instance to send the DNS request to a specific other private DNS server of the network or to an external DNS server.

The private DNS server that sends a DNS request for external resolution can receive and cache the resolution. Additionally, it could send the resolution around to others of the private DNS server in the network. In situations where a first private DNS server has sent off a DNS request for handling by one or more of the other private DNS servers and the DNS request was resolved by a second private DNS server in the network, either from a cached resolution held by the second private DNS server or by way of an external lookup, a DNS response can be returned to the first server for caching. In this manner, the first private DNS server can receive, from the second private DNS server, a DNS response in response to the DNS request that the first DNS server sent off to the second server, and cache this DNS response as a resolution of the DNS request that the first server sent off to the second server.

The activity to obfuscate DNS requests sent to external servers can, in some embodiments, be selectively enabled and disabled. An enterprise or individual user may not always want decoy DNS requests to be generated and sent as noise, in which case an enabling/disabling toggle can be made available for use by appropriate entities to control this activity. A process can therefore provide selective enablement and disablement of the obfuscating of DNS request activity being handled by the private DNS server(s). Disablement can be a scheduled or otherwise temporary action. It might be desired in situations where provision of decoy requests is creating problems. Disabling the activity might be desired during overnight hours or in situations where external DNS servers identify too high a volume of requests coming from the private network, for instance.

Aspects described herein advantageously provide for enterprise level DNS obfuscation. Across a business or corporate network, the system provides the ability to effectively hide user DNS traffic from traditional vectors of information exposure/sensitive data leakage. It also significantly reduces the 'chain of trust' required to securely make DNS requests, avoiding unnecessary reliance on external entities and their potentially flawed security implementations. By hosting trusted local DNS server(s), the organization gains control over DNS requests that follow initial DNS requests, avoid the need for at least some additional DNS traffic to exit the network to untrusted entities. It can be used to hide from an attacker the identification of websites that users of the organization are visiting. This may be effective in addressing situations where an attacker learns a particular website is visited frequently by the organization and therefore exploits that website's poor security to compromise the site and add malicious payloads thereto as a way to infiltrate the organization's systems (watering hole attack).

Additionally, aspects described herein do not rely on the effectiveness of security measures implemented by external DNS servers to ensure security. For instance, some approaches encrypt DNS requests being passed through untrusted servers in order to hide the domain that is being queried. Under this approach, the DNS request is encrypted and attached to a request made to the external server, but the external server is assumed to be trusted, as it decrypts and resolves the request before encrypting and passing back the result to the client. Such approach is intended to prevent third-party (not including the external DNS server itself) surveillance; it would still allow the external DNS server operator to track and monitor the queries and associate them with source IP addresses or specific users. It does not prevent surveillance by the DNS operator. In contrast, the effectiveness of an obfuscation strategy as discussed herein does not rely on a trusted status of the external DNS server(s) involved.

Figure 3:
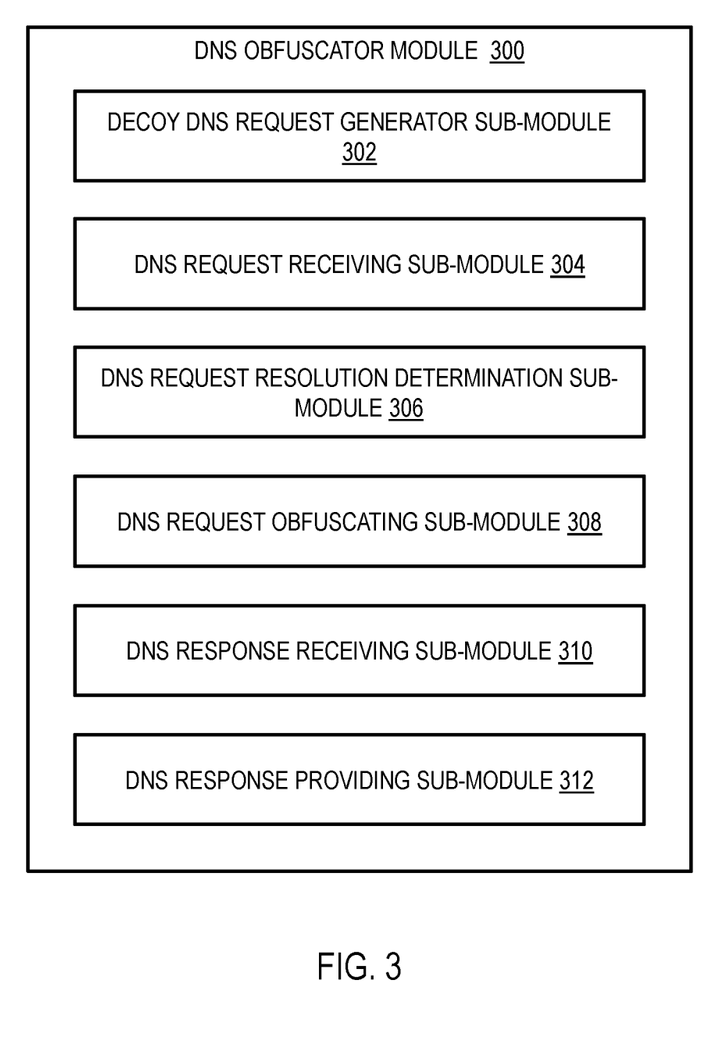
FIG. 3 depicts further details of an example DNS obfuscator module to incorporate and/or use aspects described herein.

FIG. 3 depicts further details of an example DNS request obfuscator module (e.g., DNS obfuscation module 300 of FIG. 1) to incorporate and/or use aspects described herein. In one or more aspects, DNS request obfuscator module 300 includes, in one example, various sub-modules to be used to perform DNS request obfuscation. The sub-modules can be or include, e.g., computer readable program code (e.g., instructions) in computer readable media, e.g., persistent storage (e.g., persistent storage 113, such as a disk) and/or a cache (e.g., cache 121), as examples. The computer readable media may be part of a computer program product and may be executed by and/or using one or more computers or devices, and/or processor(s) or processing circuitry thereof, such as computer(s) 101, EUD 103, remote server 104, or computers of cloud 105/106 of FIG. 1, as examples, which may be or include one or more private DNS servers 206, for instance.

Referring to FIG. 3, the DNS obfuscator module 300 includes a decoy DNS request generator sub-module 302 for generating decoy DNS requests for sending to external DNS server(s), a DNS request receiving sub-module 304 for receiving legitimate DNS requests, for instance form client device(s) and/or other private DNS servers of a network, a DNS request resolution determination sub-module 306 which determines whether resolutions of received DNS requests are cached by the private DNS server, a DNS request obfuscating sub-module 308, which obfuscates DNS requests by sending to external DNS server(s) the DNS requests interspersed with generated decoy DNS requests, a DNS response receiving sub-module 310 for receiving, from external DNS server(s), DNS response(s) to sent DNS request(s), and a DNS response providing sub-module 312 for providing DNS responses to sources of the received DNS requests.

In examples a DNS obfuscator module 300 is executed on each private DNS server of one or more private DNS servers of an organization's private network.

Figure 4:
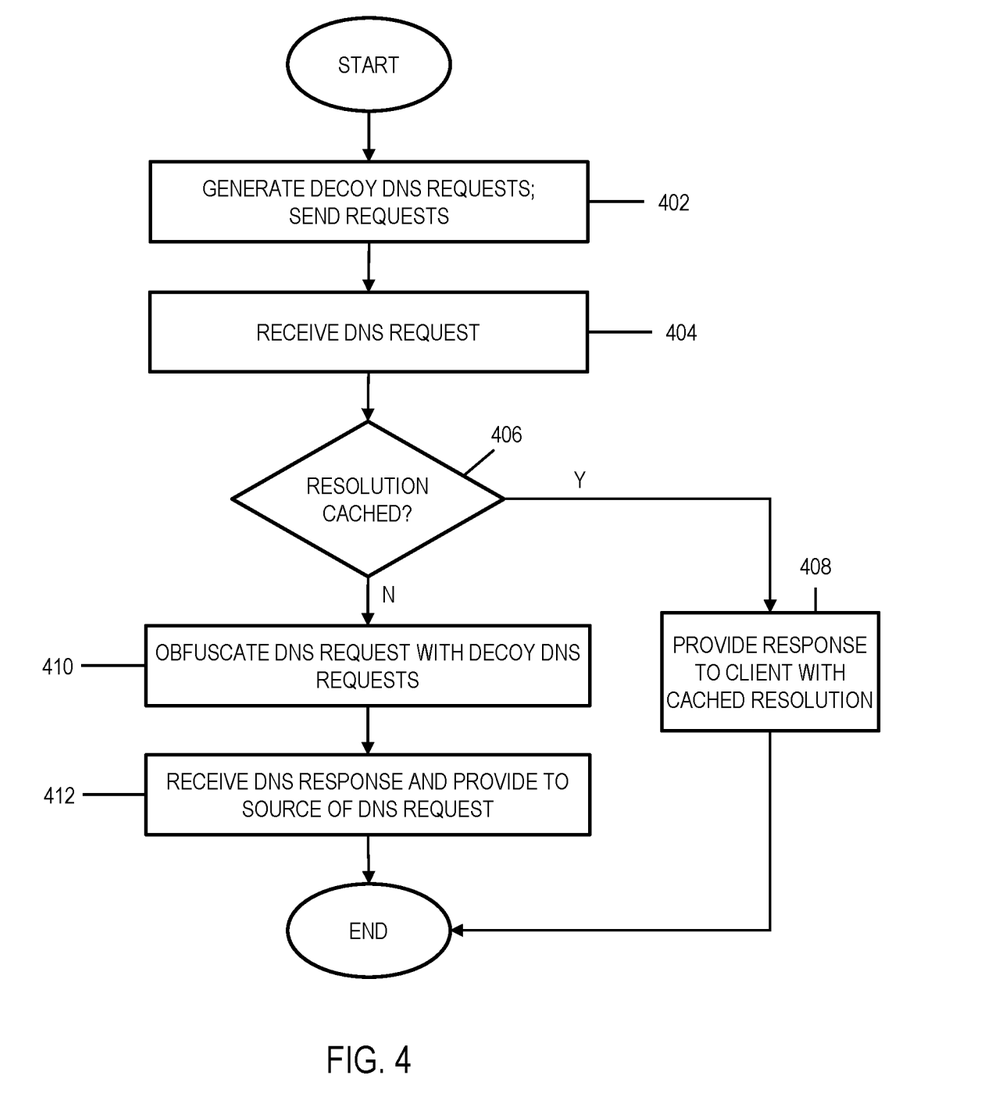
FIG. 4 depicts an example process for DNS request obfuscation, in accordance with aspects described herein.

FIG. 4 depicts an example process for DNS request obfuscation, in accordance with aspects described herein. The process may be executed, in one or more examples, by a processor or processing circuitry of one or more computers/computer systems, such as those described herein, and more specifically those described with reference to FIG. 1. In one example, code or instructions implementing the process(es) of FIG. 4 are part of a module, such as module 300 of a private DNS server of one or more private DNS servers working in concert with each other as described herein to fulfill client DNS requests. In other examples, the code may be included in one or more modules and/or in one or more sub-modules of the one or more modules. Various options are available.

The process of FIG. 4 includes generating (402) decoy domain name system (DNS) requests for obfuscating DNS request activity being handled by one or more private DNS server(s) for an organization and sending the decoy DNS requests to one or more external DNS servers for resolution. The generating and sending of the decoy DNS requests can be performed in accordance with configurable criteria that dictates lookup targets for the generated decoy DNS requests and timing to send the decoy DNS requests. For example, the configurable criteria can specify a relatedness level to use in generating the decoy DNS requests, the relatedness level indicating a desired level of relation between the lookup targets for the generated decoy DNS requests and a lookup target of a DNS request being handled.

Additionally or alternatively, at least some of the decoy DNS requests can be generated based on search results pertaining to content provided at the lookup target of a DNS request being handled, and/or crowdsourcing other DNS requests of the organization, in which (i) similar DNS requests of the crowdsourced other DNS requests and/or (ii) at least one decoy DNS request generated based on the similar DNS requests are included in the generated decoy DNS requests.

Additionally or alternatively, the configurable criteria can include a rate at which to send DNS requests to the one or more external DNS servers, the rate including a number of DNS requests to send per segment of time, where a number of the decoy DNS requests to send in a segment of time is based on a number of client DNS requests being sent in the segment of time. This rate can dynamically adjust based on an overall client DNS request activity load.

Continuing with the process of FIG. 4, the process receives (404), by the private DNS server, a DNS request seeking a DNS lookup for a client device. The DNS request could be received from the client device or could be received from another private DNS server of the organization, as examples. The private DNS executing the process of FIG. 4 could process this request differently depending on the situation, for instance by making an external request for resolution and/or providing it to other private DNS server(s) of the organization for resolution.

In the example of FIG. 4, the process continues by determining (406), based on receiving the DNS request, whether a resolution of the DNS request is cached by the private DNS server. If so (406, Y), the process provides (408) a response to the client with the cached resolution. Otherwise (406, N), the process continues by obfuscating (410) the DNS request by sending, to an external DNS server of the one or more external DNS servers, the DNS request interspersed with at least some of the generated decoy DNS requests sent to the external DNS server. In some embodiments, each decoy DNS request is sent to just one upstream (external) DNS server. The process continues at 412 with receiving, from the external DNS server, a DNS response to the sent DNS request and providing the DNS response to a source of the DNS request. The private DNS server could have received the DNS request (at 404) from the client device itself and thus provide the DNS response to the client device. Alternatively, the private DNS server could have received the DNS request from another private DNS server of the organization, and thus provide the DNS response to (at least) that other private DNS server and/or the client device.

As an enhancement, processing could provide selective enablement and disablement of the obfuscating DNS request activity being handled by the private DNS server, where the generating (402) the decoy DNS requests and the obfuscating (410) the received DNS request is performed based on selective enablement of the obfuscating DNS request activity being handled by the private DNS server.

Further, an example process performed by a private DNS server, for instance a DNS obfuscator module thereof, could receive a DNS request from a client device or other private DNS server and send the DNS request off to another one of the private DNS servers to handle. The process can receive a DNS request, determine that no resolution of the DNS request is cached by the private DNS server, and initiate an attempted resolution of the DNS request by at least one other private DNS server of the organization. For instance, the private DNS server sends the request to an identified other private DNS server. It may be that a minimum number of hops to other private DNS servers are needed before a DNS request gets sent out for external resolution, for instance.

A private DNS server that forwarded a DNS request to another private DNS server for resolution can later receive, from another private DNS server, a DNS response in response to the DNS request that was forwarded, and cache this DNS response as a resolution of the DNS request so that the resolution is cached and available for resolving further DNS requests at a later time, if needed.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
generating decoy domain name system (DNS) requests for obfuscating DNS request activity being handled by a private DNS server for an organization, and sending the decoy DNS requests to one or more external DNS servers for resolution;
receiving, by the private DNS server, a DNS request seeking a DNS lookup for a client device;
obfuscating the DNS request by sending, to an external DNS server of the one or more external DNS servers, the DNS request interspersed with at least some of the generated decoy DNS requests sent to the external DNS server;
receiving, from the external DNS server, a DNS response to the sent DNS request; and
providing the DNS response to a source of the DNS request.

2. The method of claim 1, wherein the generating and sending the decoy DNS requests is performed in accordance with configurable criteria that dictates lookup targets for the generated decoy DNS requests and timing to send the decoy DNS requests.

3. The method of claim 2, wherein the configurable criteria comprises a rate at which to send DNS requests to the one or more external DNS servers, the rate comprising a number of DNS requests to send per segment of time, wherein a number of the decoy DNS requests to send in a segment of time is based on a number of client DNS requests, including the received DNS request, being sent in the segment of time.

4. The method of claim 3, wherein the rate dynamically adjusts based on an overall client DNS request activity load.

5. The method of claim 2, wherein the configurable criteria specifies a relatedness level to use in generating the decoy DNS requests, the relatedness level indicating a desired level of relation between the lookup targets for the generated decoy DNS requests and a lookup target of the DNS request.

6. The method of claim 5, wherein at least some of the decoy DNS requests are generated based on at least one selected from the group consisting of:
search results pertaining to content provided at the lookup target of the DNS request; and
crowdsourcing other DNS requests of the organization, wherein at least one selected from the group consisting of (i) similar DNS requests of the crowdsourced other DNS requests and (ii) at least one decoy DNS request generated based on the similar DNS requests are included in the generated decoy DNS requests.

7. The method of claim 1, wherein the private DNS server receives the DNS request from the client device and provides the DNS response to the client device.

8. The method of claim 1, wherein the private DNS server receives the DNS request from another private DNS server of the organization, and wherein the private DNS server provides the DNS response to at least one selected from the group consisting of: the other private DNS server, and the client device.

9. The method of claim 1, further comprising:
determining, based on receiving the DNS request, whether a resolution of the DNS request is cached by the private DNS server, and wherein the obfuscating the DNS request is performed based on determining that no resolution of the DNS request is cached by the private DNS server.

10. The method of claim 1, further comprising:
providing selective enablement and disablement of the obfuscating DNS request activity being handled by the private DNS server, wherein the generating the decoy DNS requests and the obfuscating the received DNS request is performed based on selective enablement of the obfuscating DNS request activity being handled by the private DNS server.

11. The method of claim 1, wherein the DNS request is a first DNS request, and wherein the method further comprises:
receiving a second DNS request;
determining that no resolution of the second DNS request is cached by the private DNS server; and
initiating attempted resolution of the second DNS request by at least one other private DNS server of the organization.

12. The method of claim 11, further comprising:
receiving, from another private DNS server of the at least one other private DNS server, a DNS response in response to the second DNS request, and caching the DNS response as a resolution of the second DNS request.

13. The method of claim 1, wherein the one or more external DNS servers comprise a plurality of external DNS servers, and wherein the method further comprises:
receiving a plurality of other DNS requests seeking DNS lookups for the client device; and
repeating the obfuscating for each of the other DNS requests, wherein, for each other DNS request of the other DNS requests, a different external DNS server of the plurality of external DNS servers is selected for sending the other DNS request interspersed with respective other decoy DNS requests.

14. The method of claim 13, wherein the obfuscating the DNS request further comprises sending one or more of the generated decoy DNS requests to another external DNS server of the plurality of external DNS servers contemporaneous with the sending of the DNS request.

15. A computer system comprising:
a memory; and
a processor in communication with the memory, wherein the computer system is configured to perform a method comprising:

generating decoy domain name system (DNS) requests for obfuscating DNS request activity being handled by a private DNS server for an organization, and sending the decoy DNS requests to one or more external DNS servers for resolution;

receiving, by the private DNS server, a DNS request seeking a DNS lookup for a client device;

obfuscating the DNS request by sending, to an external DNS server of the one or more external DNS servers, the DNS request interspersed with at least some of the generated decoy DNS requests sent to the external DNS server;

receiving, from the external DNS server, a DNS response to the sent DNS request; and providing the DNS response to a source of the DNS request.

16. The computer system of claim 15, wherein the generating and sending the decoy DNS requests is performed in accordance with configurable criteria that dictates lookup targets for the generated decoy DNS requests and timing to send the decoy DNS requests, wherein the configurable criteria comprises a rate at which to send DNS requests to the one or more external DNS servers, the rate comprising a number of DNS requests to send per segment of time, wherein a number of the decoy DNS requests to send in a segment of time is based on a number of client DNS requests, including the received DNS request, being sent in the segment of time.

17. The computer system of claim 15, wherein the generating and sending the decoy DNS requests is performed in accordance with configurable criteria that dictates lookup targets for the generated decoy DNS requests and timing to send the decoy DNS requests, wherein the configurable criteria specifies a relatedness level to use in generating the decoy DNS requests, the relatedness level indicating a desired level of relation between the lookup targets for the generated decoy DNS requests and a lookup target of the DNS request.

18. The computer system of claim 15, wherein the private DNS server receives the DNS request from another private DNS server of the organization, and wherein the private DNS server provides the DNS response to at least one selected from the group consisting of: the other private DNS server, and the client device.

19. The computer system of claim 15, wherein the one or more external DNS servers comprise a plurality of external DNS servers, and wherein the method further comprises:

receiving a plurality of other DNS requests seeking DNS lookups for the client device; and repeating the obfuscating for each of the other DNS requests, wherein, for each other DNS request of the other DNS requests, a different external DNS server of the plurality of external DNS servers is selected for sending the other DNS request interspersed with respective other decoy DNS requests.

20. A computer program product comprising:

a computer readable storage medium readable by a processing circuit and storing instructions for execution by the processing circuit for performing a method comprising:

generating decoy domain name system (DNS) requests for obfuscating DNS request activity being handled by a private DNS server for an organization, and sending the decoy DNS requests to one or more external DNS servers for resolution;

receiving, by the private DNS server, a DNS request seeking a DNS lookup for a client device;

obfuscating the DNS request by sending, to an external DNS server of the one or more external DNS servers, the DNS request interspersed with at least some of the generated decoy DNS requests sent to the external DNS server;

receiving, from the external DNS server, a DNS response to the sent DNS request; and providing the DNS response to a source of the DNS request.

* * * * *